Patent 3,462,293 — Aug. 19, 1969

3,462,293
COATED EXPANDABLE POLYSTYRENE
William H. Voris, Mars, Pa., assignor to Koppers
Company, Inc., a corporation of Delaware
No Drawing. Filed Nov. 7, 1966, Ser. No. 592,271
Int. Cl. B44d 1/48; B44c 1/06; C08d 13/24
U.S. Cl. 117—100                                            4 Claims

ABSTRACT OF THE DISCLOSURE

Expandable polystyrene beads are uniformly coated with polymeric material to enhance the properties of the beads and articles made therefrom by a process comprising suspending the expandable beads in a stream of air at 100–130° F. and contacting the beads with an aqueous latex which dries in the heated air stream to form a uniform particulate or film coating.

---

Expandable polystyrene beads are a well known commercial item. Such expandable beads are useful in the molding of numerous low density plastic articles. There still remains, however, some problems associated with the use of such expandable beads. For example, the expandable beads employing a volatile expanding agent tend to lose the volatiles on storage. In addition to volatile loss, beads which are colored with various dyes also have the disadvantage of losing some of their coloring through leaching. Other problems associated with such expandable beads are their tendency to lump during pre-expansion and also the low abrasion resistance of articles formed from such expandable polystyrene beads.

Heretofore, processes for coating expandable polystyrene beads with resinous materials have resulted in a product which retains tackiness and must be cured before further processing, or in beads which are preformed into a desired shape before further molding to the final article.

I have discovered that expandable polystyrene beads can be uniformly coated with polymeric materials by a novel process which results in better volatile retention of the unexpanded beads and also aids in the prevention of lumping during pre-expansion of such expandable beads before molding. My process results in beads which have better dye retention than uncoated beads and upon molding provide articles which are abrasion resistant.

In accordance with the present invention, expandable polystyrene beads are uniformly coated with polymeric materials by suspending the beads in a heated air stream and contacting the beads with an aqueous latex which dries in the heated air to form a uniform particulate or film coating on the beads. The beads so processed are discrete particles suitable for immediate feeding into a mold for expansion to desirable foamed products.

The temperature of the air employed in the suspension of expandable polystyrene beads must be such that there is little loss of volatiles from the beads, that is to say, little loss of blowing agent incorporated in the expandable beads, during the coating step. Temperatures in the order of 100 to 130° F. are used in the present process, such temperatures causing little or no loss of volatiles from the expandable beads which are being coated, but still being a temperature at which the latex which is being used as a coating for the bead will dry on the beads.

The polymeric material employed as a coating for the expandable polystyrene beads must be that which will form a coating on the beads at the conditions employed during the coating process, which coating will not be tacky at room temperature. If the coated beads are themselves tacky at room temperature, the beads will lose their ability to be fed as discrete particles into a mold in the formation of the expandable products. The coated beads may feel somewhat tacky to touch, owing to the external heat which is provided by the human body temperature while the beads are held in the hand, although the beads may still be suitable for feeding into a mold whereby the coated expandable beads are in contact only with each other.

Especially uniform and well coated expandable polystyrene beads are provided which have imparted thereto various desirable improvements, both in the processing and manufacturing of useful foamed products and in the properties of the products as their unexpanded, expanded, and molded or extruded foamed forms. Major process benefits derivable from such coating of expandable polystyrene beads are the prevention of dry sticking of expanded beads, prevention of lumping on pre-expansion, and an improvement in the storage life of both unexpanded and expanded beads. The coated beads exhibit increased abrasion resistance over normal expandable polystyrene beads, by the formation of a uniform coating of polymeric material around the beads, whereby the beads upon expansion form a molded object having a tough outer skin.

The coated expandable polystyrene beads prepared by the present invention have excellent anti-lumping properties. As is known in the art, expandable polystyrene beads have a tendency to stick together and form lumps during the pre-expansion process which renders the particles unsuitable for molding. Heretofore, lubricants have been added to the surface of the particles to alleviate this problem, but the amount of lubricant had to be carefully controlled. Such lubricants can also interfere with fusion of the beads on molding, and can reduce the shelf life of the particle due to a rapid loss of blowing agent, in addition to interfering with the free-flowing properties of beads because of their oily nature.

The latex used to coat the expandable polystyrene beads is preferably comprised of a polymeric material produced from an ethylenically unsaturated monomer, such as ethylene, propylene, butylene, or styrene. The polymeric material may be a homopolymer of the above monomers or a copolymer. Also useful are acrylate polymers and acrylate copolymers of ethylenically unsaturated monomers. Especially useful polymeric materials are polyethylene, polyvinyl chloride copolymers, polyethylacrylates and styreneacrylate copolymers.

The expandable polystyrene beads to be coated are commercially available under various trade names. The beads may be prepared, for example, according to D'Alelio Patent No. 2,983,692. Such beads contain volatile organic blowing agents such as pentane, hexane, cyclohexane, heptane, isopentane, and halogenated derivatives thereof, which agents boil below the softening point of the styrene polymer. Expandable polystyrene beads containing minor amounts of other polymeric materials such as styrene-alpha-methylstyrene copolymers are also useable in the invention.

The amount of polymeric material which is deposited on the expandable styrene polymer beads should be between 0.5 and 15% by weight. Lesser amounts of coating does not result in sufficient improvement of the properties of the resulting beads. Greater amounts are unnecessary as microscopic examination of the product of the invention shows the coating to be deposited in a uniform manner over the surface of the beads, so that minimum amounts of polymeric material provide the improved properties to the expandable styrene polymeric beads. My invention is further illustrated by the following examples:

Example I

A quantity of Dylite® F-40 expandable polystyrene beads were screened through a 16-mesh U.S. standard screen and held on a 25-mesh screen to obtain a mass of beads of substantially uniform size. These expandable polystyrene beads are spherical and have a glassy smooth surface. The beads contained as expanding agent pentane in the amount of 6.7% by weight of the bead. The mass of beads was acidified, washed and dried. The mass of beads had the following bead size distribution:

| Mesh: | Percent retained |
|---|---|
| 18 | 20.2 |
| 20 | 37.8 |
| 25 | 30.6 |
| 30 | 5.8 |
| 40 | 2.8 |

Aliquots of these beads were employed in the process of the invention and coated with the various latices described in the examples below. One aliquot was set aside as a control and was Composition A.

Example II

Two-kilograms of beads from Example I were fed to a fluidized bed apparatus of the type described in U.S. Patent 3,117,027. While the expandable polystyrene beads were suspended in a stream of heated air (the temperature of the air for each aliquot coated described below), the air flow at about 50 c.f.m. and a nozzle pressure of about 50–80 p.s.i. Each of the latices described below were fed to the apparatus through a nozzle in the lower portion of the apparatus. Four separate runs, to coat four different aliquots, were made. After a specified time, the beads were removed from the apparatus and weighed to determine the percent by weight of the coating on the beads. All of the coated beads were suitable for immediate feeding to a molding, extrusion or pre-expansion device for the production of expanded polystyrene articles. The four coating runs are further described in Table I.

Example IV

Tests were made to determine the effect of the coating on the volatile retention of the expandable polystyrene beads. Samples of the various compositions of Examples I and II were examined after the coating process was completed, and again, after 70 days of storage in sealed containers, following the coating process, with the following results:

| Composition | Initial volatile, percent | Volatiles, after coating process, percent | Percent volatiles retained after 70 days storage |
|---|---|---|---|
| A (control) | 6.7 | 6.18 | 47.3 |
| B | 6.7 | 6.03 | 63.8 |
| C | 6.7 | 6.09 | 61.1 |
| D | 6.7 | 6.30 | 58.4 |
| E | 6.7 | 5.95 | 64.5 |

All of the coated beads which lost very little volatiles during the coating process, showed better volatile retention than the control sample, an important factor in the storage of expandable beads.

Example V

The abrasion resistance of the compositions of Examples I and II were determined on the molded discs, by determining the weight loss and wear index, after 500 cycles with a Taber Model 503 Abrasion Tester. The results of the abrasion tests are given in Table III.

TABLE III.—ABRASION RESISTANCE OF COATED BEAD MOLDINGS

| Composition: | Wear index [1] (500 cycles) |
|---|---|
| A (Control) | 208 |
| B | 211 |
| C | 136 |
| D | 163 |
| E | 164 |

[1] Wear index:

$$\frac{\text{Wt. loss in mg.} \times 1000}{\text{No. of cycles}}$$

All of the coated bead moldings exhibited better abrasion resistance than the control, except Composition B, which was comparable to the control.

1. Process for preparing substantially uniformly coated expandable polystyrene beads suitable for feeding into a mold as discrete bead particles comprising:
    (a) suspending said expandable polystyrene beads in

TABLE I

| Composition | Latex | Air temp. (° F.) | Latex feed rate (mil/min.) | Time of run (min.) | Percent by weight of coating | Description of product |
|---|---|---|---|---|---|---|
| B | Polyethylacrylate TiO₂ pigment 42% solids, 0.95 density. | 112–118 | 6 | 42 | 5 | Smooth, flat gray, no tack, adherent film. |
| C | Vinyl-chloride vinylidene chloride copolymer (Geon 450 x 23: Goodrich) diluted to 10.7% solids. | 110 | 14 | 30 | 2.5 | Smooth, shiny, rubbery, no tack, adherent film. |
| D | Polyethylene (Poly EM-10: Spencer) anionic, MW 16000 40.6% solids, density 0.93. | 100 | 8 | 10 | 1.5 | Waxy, adherent film. |
| E | Styrene-ethylhexylacrylate copolymer (Dylex K-64, Sinclair-Koppers Co.) 33.5% solids. | 110 | 8 | 31 | 2.0 | Smooth, shiny, adherent film. |

Example III

The compositions of Examples I and II were tested for fusion characteristics and anti-lumping properties by steam molding discs (1 inch thick by 8 inch diameter). The molding was done at 20 seconds at 20–21 p.s.i.g. The results of the molding are listed in Table II.

TABLE II.—STEAM MOLDING CHARACTERISTICS OF COATED DYLITE® F-40 BEADS

| Composition | Fusion | Lumping, percent | Density, molded p.c.f. |
|---|---|---|---|
| A (control) | Good | 57 | 1.35 |
| B | Very good | 0 | 1.53 |
| C | Good | 0 | 1.60 |
| D | do | 5 | 2.01 |
| E | Very good | 0 | 1.56 | a stream of heated air, said heated air having a temperature of 100–130° F. whereat said beads do not appreciably lose their expandable properties;
    (b) contacting said expandable polystyrene beads with an aqueous latex so that said beads are coated with a layer of said latex and said coated beads are simultaneously dried while in the heated air suspension; and
    (c) removing said beads from said suspension.

2. The process of claim 1 wherein said aqueous polymer latex is a polyethylene latex.

3. The process of claim 1 wherein said aqueous polymer latex is a styrene-acrylate copolymer latex.

4. The process of claim 1 wherein said aqueous polymer latex is a vinylchloride-vinylidene chloride copolymer latex.

References Cited

UNITED STATES PATENTS

| | | | |
|---|---|---|---|
| 3,154,604 | 10/1964 | McMillan | 117—100 X |
| 3,208,965 | 9/1965 | Kuhne | 117—100 X |
| 3,185,588 | 5/1965 | Resnick | 117—100 X |
| 3,255,036 | 1/1966 | Kramer et al. | 117—100 X |

FOREIGN PATENTS

| | | |
|---|---|---|
| 482,836 | 4/1938 | Great Britain. |
| 1,025,694 | 4/1966 | Great Britain. |

WILLIAM D. MARTIN, Primary Examiner
MATHEW R. P. PERRONE, JR., Assistant Examiner U.S. Cl. X.R.

117—138.8; 260—2.5, 29.6